United States Patent Office 2,939,744
Patented June 7, 1960

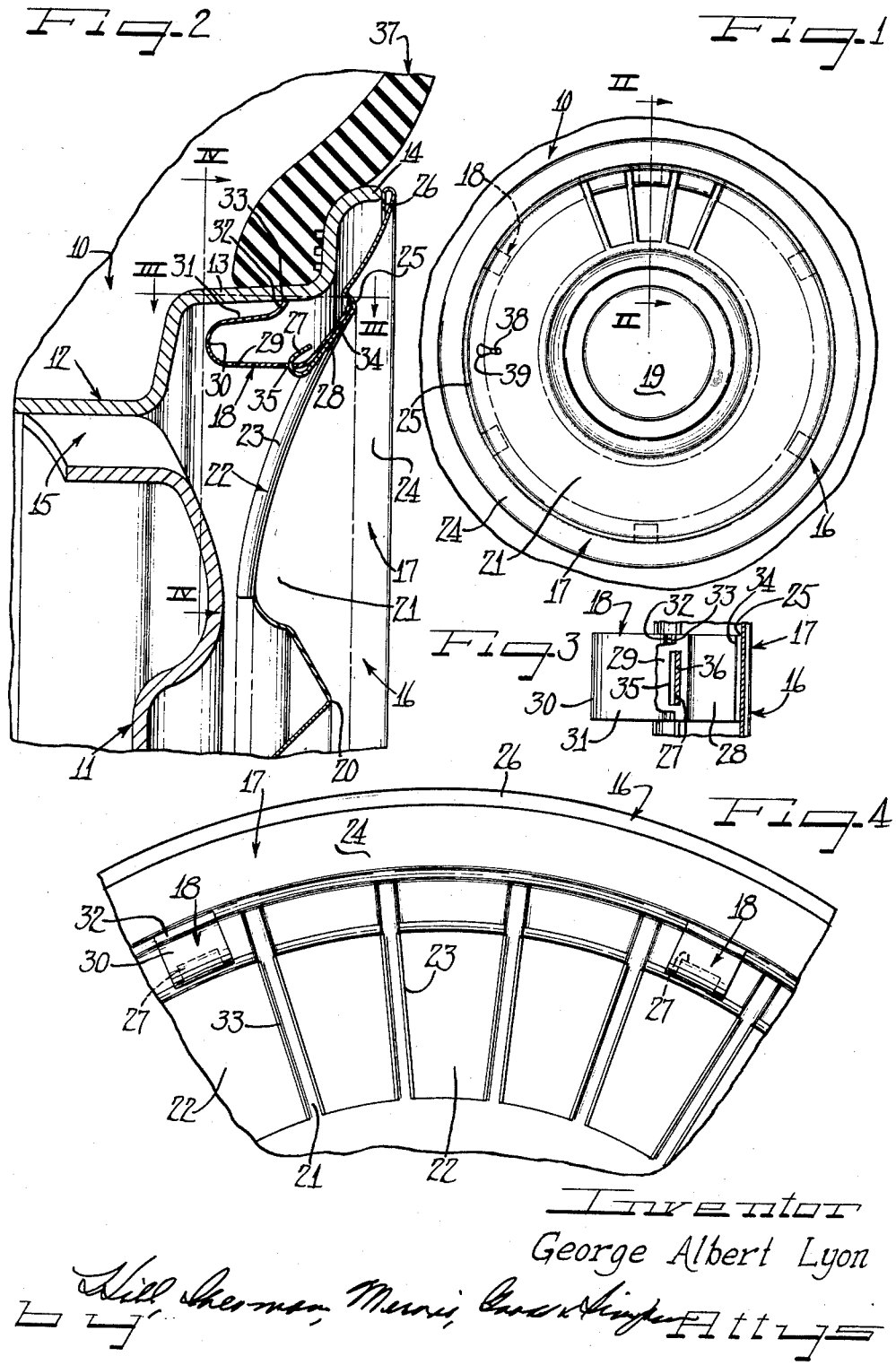

2,939,744
WHEEL COVER

George Albert Lyon, 13881 W. Chicago Blvd., Detroit, Mich.

Filed May 22, 1956, Ser. No. 586,447

7 Claims. (Cl. 301—37)

This invention relates generally to wheel structures and more particularly to an ornamental wheel cover member for overlying protective retained disposition upon a vehicle wheel.

To the end of attaining a new and highly ornamental low-cost wheel cover member which may be made from a greater variety of cover materials, the present cover construction has been developed. The wheel cover has assembled therewith on the axially inner side spring clips, and as a consequence, the cover may be made from aluminum and other suitable materials to give different ornamental appearances.

The cover and clips are here assembled and related together in a new and improved concealed manner without detrimentally altering the outside appearance of the cover.

Accordingly, an object of this invention is to provide a new and improved highly ornamental wheel cover member for detachable assembly upon a vehicle wheel.

Still another object of this invention is to provide a multi-part cover construction including a wheel cover member having advantageously interlocked therewith at circumferentially spaced interval resilient spring clips.

Yet another object of this invention is to provide a wheel structure including wheel parts and a wheel cover member each having openings to promote air circulation behind a wheel cover member to cool the wheel.

Yet another object of this invention is to provide a new and improved cover construction which lends itself to economical manufacture on a large-production basis and which cover member lends itself to being made from different materials to attain different ornamental effects.

According to the general features of this invention, there is provided in a wheel structure including a wheel having circumferentially spaced wheel openings and body and rim parts including a generally axially extending rim flange, a cover member for overlying retained disposition upon said wheel having circumferentially spaced cover openings to promote air circulation to cool the wheel, the openings being defined at one side by an axially inwardly turned extension, the cover having an annular shoulder spaced radially from said extensions, and circumferentially spaced resiliently deflectable retaining members for maintaining the cover in detachable assembly upon the wheel, the clips each having a terminal portion nested and retainingly engaged between the seat and extension interlocked assembly with the cover member.

Other objects and features of this invention will more fully become apparent in view of the following detailed description taken in conjunction with the accompanying sheet of drawings illustrating therein a single embodiment, and in which:

Figure 1 is a side elevation of my wheel structure;

Figure 2 is an enlarged fragmentary cross-sectional view taken along the line II—II of Figure 1 looking in the direction indicated by the arrows;

Figure 3 is an enlarged fragmentary cross-sectional view taken substantially on the line III—III of Figure 2 looking in the direction indicated by the arrows; and Figure 4 is an enlarged fragmentary view taken substantially on the line IV—IV of Figure 2 looking in the direction indicated by the arrows and showing my cover member.

As shown on the drawings:

The reference numeral 10 indicates generally a body part 11 which is adapted to be connected to an axle (not shown) of an automobile or the like in a conventional manner. Lugs on the axle may be inserted through openings on the body part and nuts may be threaded on the lugs to clamp the body part and wheel to the axle.

Suitably connected to the body part 11 is a conventional stepped multi-flange drop center type tire rim 12 including an intermediate generally axially extending rim flange 13 and a generally radially extending terminal rim flange 14. Disposed at circumferentially spaced intervals between the body and rim parts 11 and 12 are wheel openings 15 which open rearwardly onto the brake drum area of the wheel (not shown).

Carried on the outer side of the wheel is my new and improved ornamental wheel cover assembly 16 which is adapted to be overlyingly retained in protective relation upon the wheel. The cover assembly 16 includes an outer circular cover member 17 which is here shown as being a full disk type of cover. Interlocked on the underside of the cover 17 at circumferentially spaced intervals are resiliently deflectable retaining clips 18. The cover 17 may be made from any suitable material such as aluminum, stainless steel and the like, while the spring clips 18 are preferably made from spring steel.

The cover member 17 has a central crown 19 bounded at its periphery by an annular rib 20. Disposed on the radially outer side of the rib 20 is a dished cover portion 21 having at circumferentially spaced intervals elongated radially extending slots 22 which are each defined by axially inwardly reinforcing turned edges 23. At the junction of the dished portion 21 with outer margin 24, is an annular rib or offset grooved portion 25 defining a seat. The cover margin 24 terminates in an underturned annular bead 26 which is adapted to be bottomed against the terminal rim flange 14 when the cover is assembled upon the wheel.

The cover openings 22 are adapted when the cover is in assembly upon the wheel to cooperate with the wheel openings 15 to promote air circulation behind the cover to cool the wheel and brake drum. At least certain of the openings 22 have the material only partially cut away to provide at the radially outer edge of the openings 22 generally axially rearwardly extending extensions 27.

Retainingly disposed between the extension 27 and the annular offset portion or rib 25 are clips 18. Each of the clips 18 includes a generally radially and axially inwardly extending terminal portion 28, a generally axially extending elongated portion 29, a generally radially outwardly extending portion 30, a reverse bent generally axially outwardly slightly rearwardly extending portion 31 terminating in a turned terminal 32 having an edge 33 adapted for gripping biting engagement on the inside surface of the intermediate rim flange 13. It will be appreciated when the clips are in assembly upon the wheel the edges 33 are arranged in a common circle having a diameter slightly larger than the inside diameter of the intermediate rim flange 13 so that the clips 18 may be engaged under tension with the tire rim 12.

When the clip 18 is assembled upon the cover 17 to form cover assembly 16, the clip terminal portion 28 is bottomed radially outwardly of the cover openings 22 against the cover with terminal clip edge 34 in biting engagement within seat or groove 25. To hold the edge 34 in biting engagement in the seat 25, extension 27 extends through clip slot 35 bearing against the axially outer edge 36 (Fig. 3) of the slot 35. By the present construction and relationship between the clips 18 and the cover 17, turning of the clips 18 relative to the cover 17 is prohibited by the bottomed biting interlocked engagement between the clips and the seat.

Carried upon the wheel and particularly the tire rim 12, is a conventional tire assembly 37 which may be either a tubeless tire assembly or a pneumatic tire and tube assembly. The tire assembly 37 may be inflated by injecting air into tire valve 38 (Fig. 1).

The cover assembly 16 may be assembled upon the wheel by initially aligning cover opening 39 with respect to the valve 38 and moving the cover axially inwardly until the clip edges 33 tentatively engage against the tire rim 12. Upon application of additional pressure against the cover assembly 16, the edges 33 may be sprung generally radially inwardly along the inside surface of the intermediate rim flange 13 in gripping biting detachable snap-on, pry-off engagement therewith.

To remove the cover from the wheel, a suitable pry-off tool may be inserted underneath the bead 26 and twisted until the clip edges 33 become disengaged from the rim flange 13.

It will be understood that variations and modifications may be effected without departing from the scope of the novel concepts of my invention.

I claim as my invention:

1. A wheel cover member for disposition on the outer side of a vehicle wheel, the cover having circumferentially spaced cover openings and with at least some of the openings having extensions turned rearwardly away from the openings, the cover having shoulder means spaced radially outwardly of the extensions and cooperating with the extensions in defining seats, and cover retaining clips disposed in said seats for engagement with a wheel, the clips each having a clip flange portion bearing against the shoulder means, said extension bearing against said clip urging said clip flange portion against the shoulder means and locking the clip in assembly with the cover.

2. A wheel cover member for disposition on the outer side of a vehicle wheel, the cover having circumferentially spaced cover openings and with at least some of the openings having extensions turned rearwardly away from the openings, the cover having shoulder means spaced radially outwardly of the extensions and cooperating with the extensions in defining seats, and cover retaining clips disposed in said seats for engagement with a wheel, the clips each having a clip flange portion bearing against the shoulder means, said clips each having an extension opening through which said extension extends forcing said clip flange portion against the shoulder means and locking the clip in assembly with the cover.

3. The cover of claim 1 further characterized by its clips each comprising an axially outwardly opening looped portion, the looped portion having its radially outer free end turned radially outwardly relative to the looped portion providing a short stiff generally radially extending terminal for sustaining the cover in removable assembly on a vehicle wheel.

4. The cover of claim 3 further characterized by the opposite free end of each of the clips comprising the clip flange portion locked in said seat.

5. The cover of claim 1 further characterized by the shoulder means comprising an annular rib.

6. The cover of claim 2 further characterized by its clips each comprising an axially outwardly opening looped portion, the looped portion having its radially outer free end turned radially outwardly relative to the looped portion providing a short stiff generally radially extending terminal for sustaining the cover in removable assembly on a vehicle wheel.

7. In a wheel structure including a tire rim having an intermediate generally axially extending radially inwardly facing rim flange, a wheel cover member for disposition on the outer side of a vehicle wheel, the cover having circumferentially spaced cover openings and with at least some of the openings having extensions turned rearwardly away from the openings, the cover having shoulder means spaced radially outwardly of the extensions and cooperating with the extensions in defining seats, and cover retaining clips disposed in said seats for engagement with the wheel, the clips each having a clip flange portion bearing against the shoulder means, said extension bearing against said clip urging said clip flange portion against the shoulder means and locking the clip in assembly with the cover, the clips each being resiliently deflectable and engageable with the rim flange for sustaining the cover in assembly with the wheel.

References Cited in the file of this patent

UNITED STATES PATENTS

| | | |
|---|---|---|
| 2,186,550 | Lyon | Jan. 9, 1940 |
| 2,368,228 | Lyon | Jan. 30, 1943 |
| 2,683,629 | Lyon | July 13, 1954 |